(12) United States Patent
Adderly et al.

(10) Patent No.: US 10,891,548 B2
(45) Date of Patent: *Jan. 12, 2021

(54) ELECTROMAGNETIC NOISE SIGNAL BASED PREDICTIVE ANALYTICS

(71) Applicant: International Business Machines Corporation, Armonk, NY (US)

(72) Inventors: Darryl M. Adderly, Morrisville, NC (US); Rosanna S. Mannan, San Jose, CA (US); Kevin L. Schultz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

This patent is subject to a terminal disclaimer.

(21) Appl. No.: 15/288,477

(22) Filed: Oct. 7, 2016

(65) Prior Publication Data

US 2018/0101772 A1   Apr. 12, 2018

(51) Int. Cl.
*G06N 5/04*      (2006.01)
*G06F 3/041*     (2006.01)
(Continued)

(52) U.S. Cl.
CPC ............... *G06N 5/04* (2013.01); *G06F 3/046* (2013.01); *G06F 3/0416* (2013.01); *G06N 20/00* (2019.01)

(58) Field of Classification Search
CPC ........ G06N 5/04; G06N 20/00; G06F 3/0416; G06F 3/046
See application file for complete search history.

(56) References Cited

U.S. PATENT DOCUMENTS 7,355,409 B2   4/2008   Larsen
8,476,897 B2   7/2013   Favre-Reguillon et al.
(Continued)

FOREIGN PATENT DOCUMENTS

CN   205353218 U   6/2016
JP   2009168501 A   7/2009
(Continued)

OTHER PUBLICATIONS

Laput et al., "EMSense: Recognizing Handled, Uninstrumented, Electro-Mechanical Objects Using Software-Defined Radio", ACM Symposium on User Interface Software and Technology (ACM UIST) 2015, Nov. 8, 2015, Disney Research, © Copyright 2012 Disney, <https://www.disneyresearch.com/publication/emsense/>, 2 pages.

(Continued)

*Primary Examiner* — Eric Nilsson
(74) *Attorney, Agent, or Firm* — Michael A. Petrocelli

(57) ABSTRACT

In an approach to predicting user touch events, one or more computer processors receive a detected electromagnetic noise signal of an object. The one or more computer processors compare the detected electromagnetic noise signal of the object to one or more stored electromagnetic noise signals associated with one or more objects. Based, at least in part, on the comparison, the one or more computer processors determine the identity of the object. Responsive to determining the identity of the object, the one or more computer processors store metadata associated with at least one of the objects and an electromagnetic noise signal detection event. The one or more computer processors determine whether an amount of the metadata associated with the object meets a learning threshold. If the amount of metadata meets the learning threshold, the one or more computer processors predict a subsequent electromagnetic noise signal detection event associated with the object.

20 Claims, 3 Drawing Sheets

(51) Int. Cl.
*G06F 3/046* (2006.01)
*G06N 20/00* (2019.01)

(56) References Cited

U.S. PATENT DOCUMENTS

| | | | |
|---|---|---|---|
| 8,542,106 | B2 | 9/2013 | Hilsebecher et al. |
| 9,329,146 | B2 | 5/2016 | Everett et al. |
| 2006/0125806 | A1 | 6/2006 | Voyles et al. |
| 2012/0162057 | A1* | 6/2012 | Tan .................. G06F 3/011 345/156 |
| 2015/0219704 | A1 | 8/2015 | Ohmae et al. |
| 2015/0301608 | A1 | 10/2015 | Nagaraju et al. |
| 2016/0259451 | A1 | 9/2016 | Bau et al. |
| 2016/0261268 | A1 | 9/2016 | Rakova et al. |
| 2017/0124816 | A1* | 5/2017 | Yang ................. H04M 1/72569 |
| 2018/0101778 | A1 | 4/2018 | Adderly et al. |

FOREIGN PATENT DOCUMENTS

| | | |
|---|---|---|
| KR | 200360045 Y1 | 8/2004 |
| WO | 2015003377 A1 | 1/2015 |
| WO | 2016097376 A1 | 6/2016 |

OTHER PUBLICATIONS

Laput et al., "EM-Sense: Touch Recognition of Uninstrumented, Electrical and Electromechanical Objects", UIST '15, Nov. 8-11, Charlotte, NC, USA, Copyright is held by the owner/author(s), Publication rights licensed to ACM, ACM 978-1-4503-3779-3, 10 pages.

Lindsay et al., "Improved Wearable Sensor Systems", An IP.com Prior Art Database Technical Disclosure, IP.com No. IPCOM000030041D, IP.com Electronic Publication Date: Jul. 23, 2004, 20 pages.

Scalise et al., "Experimental Investigation of Electromagnetic Obstacle Detection for Visually Impaired Users: A Comparison With Ultrasonic Sensing", IEEE Transactions on Instrumentation and Measurement, vol. 61, No. 11, Nov. 2012, © 2012 IEEE, 11 pages.

"EM-Sense: Touch Recognition of Uninstrumented, Electrical and Electromechanical Objects", DisneyResearchHub, Published on Nov. 9, 2015, <https://www.youtube.com/watch?v=fpKDNIe6ia>, 3 pages.

"Integration of a thermographic camera with wearable devices for inspection and safety applications in industrial environments", An IP.com Prior Art Database Technical Disclosure, IP.com No. IPCOM000238836D, IP.com Electronic Publication Date: Sep. 22, 2014, © Copyright 2014 ABB, 4 pages.

Sandholm, et al., "Cloudfridge: a testbed for smart fridge interactions", arXiv preprint arXiv:1401.0585, 2014, 9 pages.

Adderly et al., "Electromagnetic Noise Signal Based Predictive Analytics", U.S. Appl. No. 15/663,855, filed Jul. 31, 2017, 27 pages.

Appendix P, List of IBM Patents or Patent Applications Treated as Related, 2 pages, dated Aug. 1, 2017.

Adderly, et al., "Electromagnetic Noise Signal Based Predictive Analytics", U.S. Appl. No. 16/392,831, filed Apr. 24, 2019.

List of IBM Patents or Patent Applications Treated as Related. Filed Apr. 24, 2019. 2 pages.

* cited by examiner

US 10,891,548 B2

ELECTROMAGNETIC NOISE SIGNAL BASED PREDICTIVE ANALYTICS

BACKGROUND OF THE INVENTION

The present invention relates generally to the field of data analytics, and more particularly to applying predictive analytics to electromagnetic noise signal data to predict user touch events.

Predictive analytics is an area of data mining that deals with extracting information from data and using the information to predict trends and behavior patterns. Often the unknown event of interest is in the future, but predictive analytics can be applied to any type of unknown, whether it be in the past, present or future. Predictive analytics encompasses a variety of statistical techniques from modeling, machine learning, and data mining that analyze current and historical facts to make predictions about future, or otherwise unknown events. The core of predictive analytics relies on determining relationships between explanatory variables and predictive variables from past occurrences, and exploiting them to predict a future event.

Electromagnetic (EM) noise signal detection is the detection of the EM noise that a product produces or captures from nearby electronic and electromechanical objects. Electronic and electromechanical objects commonly emit EM noise during operation. Non-electronic and non-electromechanical objects, such as large structural objects like doors, window frames, and furniture, may also have unique EM noise signals by acting as antennas that capture and propagate EM noise from nearby electronic and electromechanical devices. Objects emitting or conducting EM noise can have unique signal characteristics, making it possible to differentiate one object from another. EM noise signal emission may be intentional, such as in cell phones, or unintentional, such as in power lines. In response to a user touching an EM noise signal emitting or conducting object, EM noise signals are conducted through the human body, which also acts as an antenna. The conducted EM noise signals can be detected by a radio receiver.

SUMMARY

Embodiments of the present invention disclose a method, a computer program product, and a system for predicting a user touch event. The method includes one or more computer processors receiving a detected electromagnetic noise signal of an object. The one or more computer processors compare the detected electromagnetic noise signal of the object to one or more stored electromagnetic noise signals associated with one or more objects. Based, at least in part, on the comparison, the one or more computer processors determine the identity of the object. Responsive to determining the identity of the object, the one or more computer processors store metadata associated with at least one of the objects and an electromagnetic noise signal detection event. The one or more computer processors determine whether an amount of the metadata associated with the object meets a learning threshold. Responsive to determining the amount of metadata associated with the object meets the learning threshold, the one or more computer processors predict a subsequent electromagnetic noise signal detection event associated with the object.

DETAILED DESCRIPTION

The present day prevalence and rapid expansion of the capabilities of client computing devices allows for the application of predictive analytics to new types of data. As such, the flow and use of information essential to improving a user experience can benefit from the application of predictive analytics to new categories of data, such as electromagnetic noise signals from objects, identified using the expanded capabilities of modern client computing devices. By applying predictive analytics to electromagnetic noise signal detection, an improved user experience is possible. For example, the detection and recording of unique electromagnetic noise signals and the associated metadata provides predictive analytics programs with detailed information about the specific objects a user interacts with on a day to day basis, such as stoves, refrigerators, computers, and electromechanical devices. As a result, a predictive analytics program can make specific inferences based on user activity patterns associated with particular devices to provide relevant information to the user rather than broader inferences based on geolocation or manual data inputs. Embodiments of the present invention recognize that utilizing electromagnetic noise signal detection improves the efficacy of predictive analytics by providing more relevant information to the user and better managing a technological ecosystem. Implementation of embodiments of the invention may take a variety of forms, and exemplary implementation details are discussed subsequently with reference to the Figures.

Figure 1:
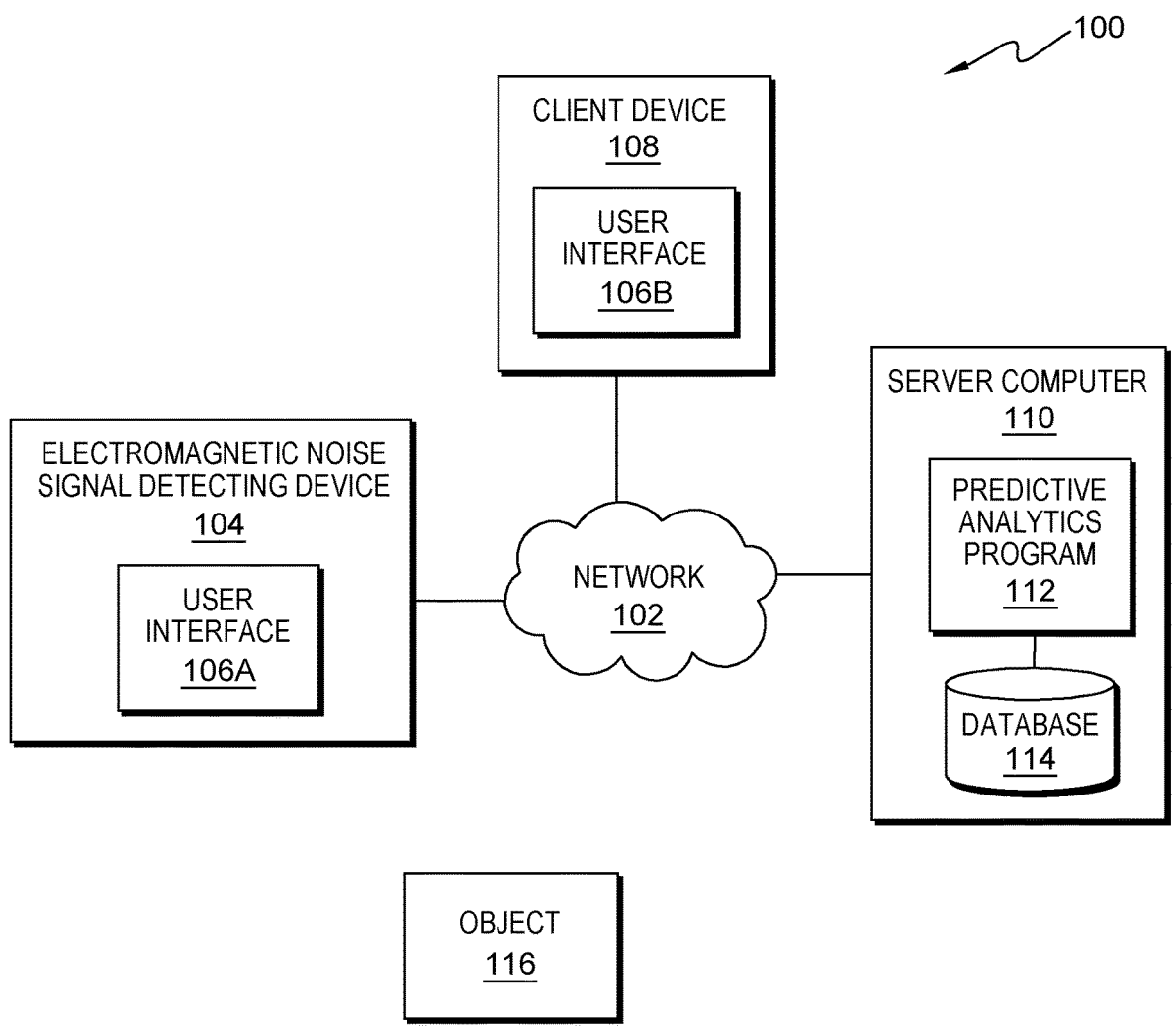
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes electromagnetic (EM) noise signal detecting device 104, client device 108, and server computer 110, all interconnected over network 102. Distributed data processing environment 100 also includes object 116. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between EM noise signal detecting device 104, client device 108, server computer 110, and other computing devices (not shown) within distributed data processing environment 100.

EM noise signal detecting device 104 conductively connects to a user and detects EM noise signals transmitted through a human body which conducts EM noise signals of objects upon contact. EM noise signal detecting device 104 can then transmit a detected EM noise signal and associated metadata to predictive analytics program 112, operating on server computer 110, via network 102. Metadata includes, but is not limited to, data such as a date, a time stamp, physical location, and accumulated frequency of touch events. EM noise signal detecting device 104 can be a smart watch, a laptop computer, a tablet computer, a smart phone, or any programmable electronic mobile device capable of detecting EM noise signals conducted through an object and a touch event, and capable of communicating with various components and devices within distributed data processing environment 100, via network 102. In one embodiment, EM noise signal detecting device 104 may also be combined with or integrated into a client device, such as client device 108, which is capable of receiving, sending, and displaying data inputs from server computer 110. In general, EM noise signal detecting device 104 represents any programmable electronic device or combination of programmable electronic devices capable of detecting EM noise signals, executing machine readable program instructions, and communicating with other computing devices, such as server computer 110 and client device 108, within distributed data processing environment 100 via a network, such as network 102. EM noise signal detecting device 104 includes an instance of user interface 106.

Client device 108 can be a smart watch, a smart television, a laptop computer, a tablet computer, a smart phone, or any programmable electronic device capable of communicating with various components and devices within distributed data processing environment 100, via network 102. In an embodiment, client device 108 may be an electronic device configured to receive, send, and display data associated with user settings. Client device 108 may receive direct input from the user via user interface 106, which may include identification of unrecognized EM noise signals or input for managing supervised learning activities. Client device 108 may represent any programmable electronic device, pre-configured electronic device, or combination of programmable and pre-configured electronic devices capable of executing machine readable program instructions and communicating with other computing devices (not shown) within distributed data processing environment 100 via a network, such as network 102. In another embodiment, client device 108 may be the same device as EM noise signal detecting device 104. In an alternative embodiment, client device 108 may limited to communicating with other computing devices (not shown) within distributed data processing environment 100 via a network, such as network 102. In the depicted embodiment, client device 108 includes an instance of user interface 106. In another embodiment, client device 108 does not include an instance of user interface 106.

User interface 106A and 106B provides an interface to predictive analytics program 112 on server computer 110 for a user of EM noise signal detecting device 104 or a user of client device 108. In one embodiment, user interface 106A and 106B may be graphical user interfaces (GUI) or web user interfaces (WUI) and can display text, documents, web browser windows, user options, application interfaces, and instructions for operation, and include the information (such as graphic, text, and sound) that a program presents to a user and the control sequences the user employs to control the program. In another embodiment, user interface 106A and 106B may also be mobile application software that provides an interface between a user of EM noise signal detecting device 104 or a user of client device 108 and server computer 110. Mobile application software, or an "app," is a computer program designed to run on smart phones, tablet computers and other mobile devices. For example, user interface 106A and 106B enables the user of EM noise signal detecting device 104 to register with and configure predictive analytics program 112 to adjust the tracking of EM noise signal touch events, such as user touch events associated with client device 108 or object 116, by the user of EM noise signal detecting device 104. In another example, user interface 106A and 106B enables the user of client device 108 to communicate with predictive analytics program 112 to receive notifications and adjust user preferences.

Object 116 can be any non-EM noise signal emitting object or non-EM noise signal emitting component of a device that is capable of acting as a conduit of EM noise signals in detectable proximity of object 116, but not capable of communicating with other computing devices via a network, such as network 102. The proximity required for object 116 to act as a conduit of surrounding EM noise signals depends on the strength of EM noise signals, the sensitivity of EM noise signal detecting device 104, and a conductivity attribute of object 116, which can depend on factors such as the size, shape, and material of construction of object 116. For example, large structural components such as metallic doors, ladders, window frames, and furniture may be large enough to capture nearby EM energy. In an embodiment, EM noise signal detecting device 104 can detect the EM noise signal captured and propagated by object 116 through direct contact between a user of EM noise signal detecting device 104 and object 116. For example, EM noise signal detecting device 104, such as a smart watch, can detect the EM noise signal of a door handle, acting as object 116, when a user wearing a smart watch capable of detecting EM noise signals touches the handle to open the door. In another example, if EM noise signal detecting device 104, such as a smart watch, cannot connect to server computer 110, then EM noise signal detecting device 104 may send the information to client computing device 108 which can relay the information to server computer 110.

Server computer 110 can be a standalone computing device, a management server, a web server, a mobile computing device, or any other electronic device or computing system capable of receiving, sending, and processing data. In some embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any other programmable electronic device capable of communicating with EM noise signal detecting device 104, client device 108, and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. Server computer 110 includes predictive analytics program 112 and database 114. Server computer 110 may include internal and external hardware components, as depicted and described in further detail with respect to FIG. 3.

Predictive analytics program 112 executes a series of steps in order to predict a user touch event by applying predictive analytics to multiple detected EM noise signals and the metadata associated with the multiple detected EM noise signals. Predictive analytics program 112 receives a detected EM noise signal of an object that a user touches or holds, such as client device 108. Predictive analytics program 112 compares the received EM noise signal from the touched object to stored EM noise signals associated with various known objects and devices. Predictive analytics program 112 attempts to identify the touched object associated with the received EM noise signal by comparison of the received EM noise signal to the various known object EM noise signals that are stored, for example, in database 114 on server computer 110. If predictive analytics program 112 does not identify the touched object associated with the received EM noise signal, then predictive analytics program 112 prompts a user to input metadata associated with the object, such as a descriptive name and/or the type of object and the location of the object, for future identification. Responsive to the user inputting metadata associated with the touched object, or if predictive analytics program 112 identifies the touched object, predictive analytics program 112 stores the metadata associated with the touched object in database 114 for future identification. For example, predictive analytics program 112 may make a prediction as to which object a user touched using confidence scores that can be set by the user for particular objects. In another example, predictive analytics program 112 may identify the object based on a confidence score based on user feedback confirming the identity of the object in previous user touch events.

Predictive analytics program 112 determines whether a quantity or frequency of user touch events stored as historical data associated with an object, such as client device 108 or object 116 meets a learning threshold. If the learning threshold is met, then predictive analytics program 112 predicts when an EM noise signal for the object will occur. Predictive analytics program 112 predicts future user touch events by establishing a pattern of user touch events correlating to user behavior, such as a date, a time stamp, a frequency of user touch events, a category of object being used, and objects touched before and after the touch event. Predictive analytics program 112 determines the action based on the prediction, such as when to display a notification or advertisement to the user of client device 108. Predictive analytics program 112 performs the action at a program-determined time and in a corresponding manner. Predictive analytics program 112 is depicted and described in further detail with respect to FIG. 2.

Database 114 is a repository for data used by predictive analytics program 112. In the depicted embodiment, database 114 resides on server computer 110. In another embodiment, database 114 may reside elsewhere within distributed data processing environment 100 provided predictive analytics program 112 has access to database 114. Database 114 can be implemented with any type of storage device capable of storing data and configuration files that can be accessed and utilized by server computer 110, such as a database server, a hard disk drive, or a flash memory. Database 114 stores metadata which includes any data that predictive analytics program 112 may use to predict future user touch events. Database 114 stores the EM noise signal data and associated metadata of particular objects that conduct EM noise signals from operating electronic devices, which are within a proximity that is detectable by EM noise signal detecting device 104. Database 114 also stores metadata associated with EM noise signal of an object, such as client device 108 or object 116. Database 114 also stores data such as registration and configuration data of EM noise signal detecting device 104 and client device 108. Registration data includes, but is not limited to, data identifying a user who interacts with client device 108 and EM noise signal detecting device 104. Configuration data includes, but is not limited to, policies identifying metadata that database 114 stores about particular objects or touch events, in association with a particular user. Database 114 may also store EM noise signal standards that predictive analytics program 112 compares to the detected EM noise signals, and device data corresponding to the EM noise signal standards.

Figure 2:
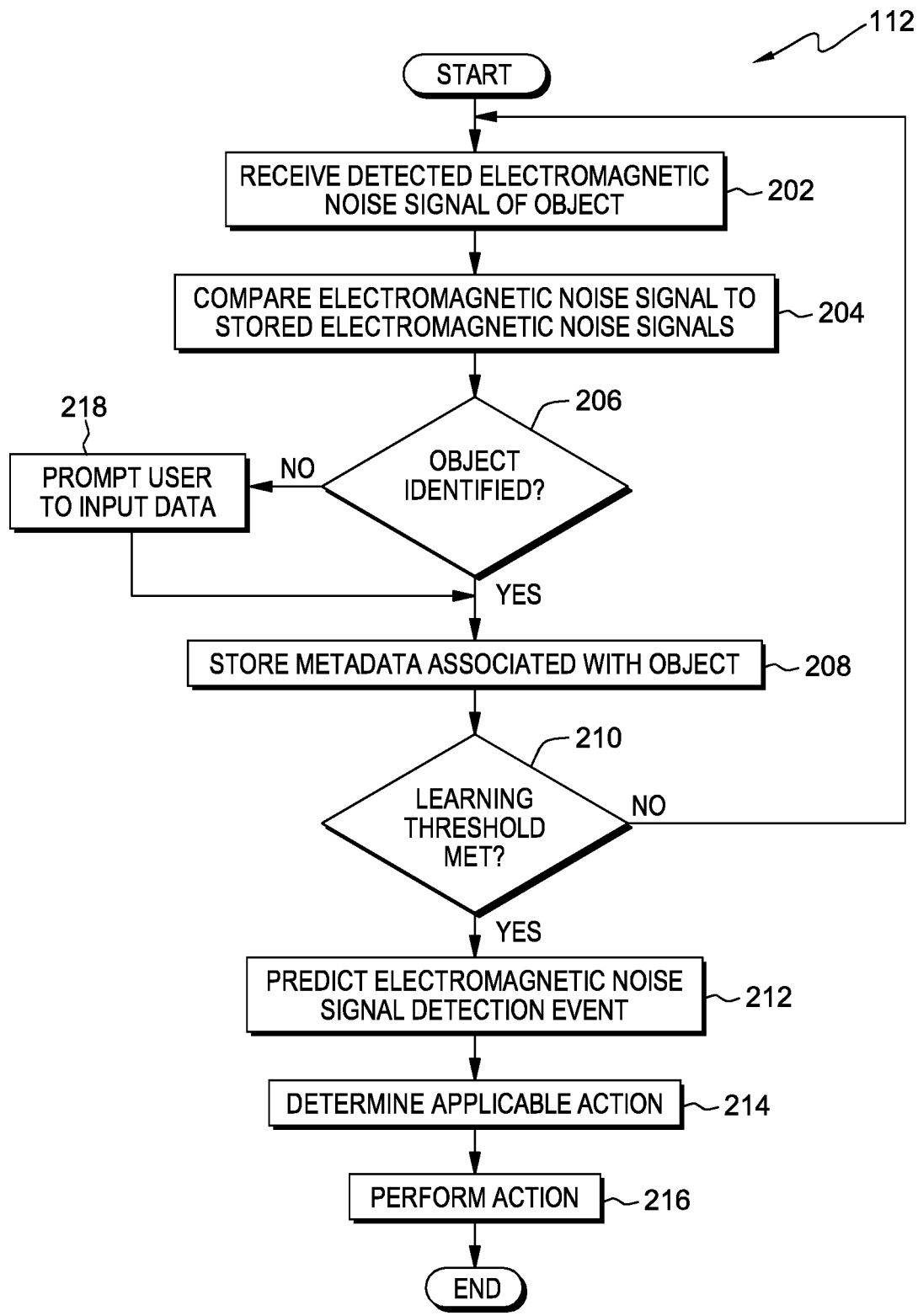
FIG. 2 is a flowchart depicting operational steps of a predictive analytics program, on a server computer within the distributed data processing environment of FIG. 1, for predicting user touch events, in accordance with an embodiment of the present invention.

FIG. 2 is a flowchart depicting operational steps of predictive analytics program 112, on server computer 110 within distributed data processing environment 100 of FIG. 1, for predicting user touch events by analyzing gathered EM noise signal data and subsequently performing an action, in accordance with an embodiment of the present invention.

Predictive analytics program 112 receives a detected EM noise signal of an object from EM noise signal detecting device 104 via network 102 (step 202). EM noise signal detecting device 104 conductively couples with a user who makes contact with an object, such as by touching client device 108 or object 116, and detects an EM noise signal unique to the object. For example, in an embodiment where EM noise signal detecting device 104 is a smart watch, a user conducts the EM noise signal through the user's body while touching various EM noise emitting or EM noise capturing objects which allows the smart watch to detect the EM noise signal.

Predictive analytics program 112 compares the received EM noise signal to stored EM noise signals (step 204). In one embodiment, database 114 includes known EM noise signal standards and stored EM noise signals resulting from one or more user touch events of an electronic or electromagnetic object, such as client device 108 or object 116. Predictive analytics program 112 compares the received EM noise signal from the object contacted by a user touch event to the EM noise signals stored within database 114. For example, a user conductively coupled with EM noise signal detecting device 104 touches the handle of a refrigerator door (i.e., a user touch event). EM noise signal detecting device 104 detects the EM noise signal conducted through the refrigerator handle and user, and transmits the EM noise signal to predictive analytics program 112, residing on server computer 110, via network 102. In the example, predictive analytics program 112 compares the received EM noise signal associated with the refrigerator door handle to the EM noise signals stored in database 114.

In some embodiments of the present invention, where a user who is conductively coupled with EM noise signal detecting device 104 touches client device 108, which may be a smart phone or tablet, EM noise signal detecting device 104 may detect and transmit the EM noise signal of client device 108 to predictive analytics program 112.

Predictive analytics program 112 attempts to identify an object associated with the received EM noise signal (decision block 206). Based on the comparison in step 204, predictive analytics program 112 attempts to match the received EM noise signal of the device or object touched by the user with a stored EM noise signal. The object may be an electronic, electromechanical, non-electronic, or non-electromechanical object.

If predictive analytics program 112 does not identify the object associated with the received EM noise signal, ("no" branch, decision block 206), then predictive analytics program 112 prompts the user through a notification to input data associated with the object (step 218). For example, predictive analytics program 112 sends a message via user interface 106 on client device 108 asking the user to input data associated with the unidentified object, such as the type of object, the brand of the object, and the location of the object. However, the user may also input any recordable data regarding the object.

Responsive to prompting the user to input data associated with the object or if predictive analytics program 112 identifies the object ("yes" branch, decision block 206), then predictive analytics program 112 stores metadata associated with the identified object (step 208). The metadata may include any data that may be used to predict future user touch events by establishing a pattern of user touch events correlating to user behavior, such as a date, a time stamp, a frequency of user touch events, a category of object being used, and objects touched before and after the touch event. Further, predictive analytics program 112 may be configured to store different types of metadata depending on the category of object and circumstances surrounding a user touch event. For example, predictive analytics program 112 may store metadata regarding the objects touched before and after the user touch event only if they fall within a pre-determined timeframe of the touch event. In another example, predictive analytics program 112 may only continue storing time stamp and date metadata for objects that a user touches on a frequent or consistent basis, such as a stove that is touched every morning between certain hours for a consecutive period of days sufficient to establish a pattern of behavior. In yet another example, predictive analytics program 112 may not store any metadata on objects that pose a privacy or security concern. For example, predictive analytics program 112 may not store location and time stamp data on objects like safes in order to prevent illegitimate parties from tracing the location of the safe and time of day a user accesses the safe. In an embodiment, predictive analytics program 112 may automatically identify additional metadata associated with the identified object to be stored. For example, predictive analytics program 112 may identify the configured metadata policies for the object and identify the relevant metadata to be stored for the object.

Predictive analytics program 112 determines whether a learning threshold is met (decision block 210). A learning threshold is met when a pre-determined quantity of metadata associated with prior user touch events for an object is available to enable predictive analytics program 112 to predict an EM noise signal touch event with a pre-determined confidence level by establishing a pattern of user behavior. In some embodiments of the present invention, the learning threshold may be the same for all objects, while in other embodiments, the learning threshold may be unique to each object. Additionally, the determination of a learning threshold depends on the existence of a quantity of data, such as instances of a user touch event, to establish a pattern of user behavior.

Predictive analytics program 112 may determine the learning threshold using any predictive analytics algorithm or combination of algorithms including, but not limited to, a time series forecast, or a supervised learning classifier. In one embodiment, predictive analytics program 112 may use a time series forecast to predict a future user touch event based on past observed values. For example, predictive analytics program 112 may collect a multitude of instances of a user of EM noise signal detecting device 104 touching a stove, a refrigerator, and a microwave at certain times of the day, for consecutive days. Based on the multitude of recorded instances of the user touch event of the stove, the refrigerator, and the microwave, predictive analytics program 112 may create a time series model in response to collecting a pre-determined quantity of data to predict future user touch events at an acceptable confidence level. In another example, predictive analytics program 112 may have sufficient metadata to meet a learning threshold but the quantity of recent or current user touch event instance data points necessary to establish the learning threshold may change.

In cases in which EM noise signal detecting device 104 does not consistently add metadata to the time series model, confidence levels may be inadequate to maintain the learning threshold. In a related example, the aforementioned scenario can occur when a user changes the data patterns by changing their behavior such as beginning to touch a device like a refrigerator at a later time of day than usual, because of a lengthier work commute. In another example, predictive analytics program 112 may utilize a supervised learning classifier to execute a regression analysis to predict the likelihood of future EM noise signal detection events using recorded metadata. For example, predictive analytics program 112 may collect a multitude of instances of a user of EM noise signal detecting device 104 touching a stove, a refrigerator, and a microwave and determine the times of day that the touch events occurred. Utilizing the metadata, predictive analytics program 112 may determine an algorithm that best fits the data pattern to predict, with pre-determined confidence levels, particular EM noise signal detection events occurring at different times of the day and determine a user's pattern of behavior. The invention is not limited by the aforementioned embodiments and may use any predictive analytics algorithm and any recordable metadata to define a learning threshold.

If predictive analytics program 112 determines that the learning threshold is not met ("no" branch, decision block 210), then predictive analytics program 112, having stored the instance and metadata of the touch event instance in step 208, returns to step 202 to receive additional detected EM noise signals.

Responsive to a determination that the learning threshold is met ("yes" branch, decision block 210), predictive analytics program 112 predicts a time and circumstance of a future EM noise signal detection event, such as a user touch event, associated with one or more objects, such as client device 108 or object 116. For example, predictive analytics program 112 may determine that there is a high confidence level, such as a 70% chance, that a user will touch the a lamp between 8:00 p.m. and 8:15 p.m. and again between 10:00 p.m. and 10:30 p.m. every weeknight. In another example, predictive analytics program 112 may determine that there is a high likelihood that the user will touch an electric toothbrush between 8:00 a.m. and 8:15 a.m. every day of the week, between 10:30 p.m. and 10:45 p.m. every weeknight, and between 12:00 a.m. and 12:15 a.m. every weekend night. In yet another example, predictive analytics program 112 may determine that there is a high likelihood that a user will touch a stove, a microwave, and a refrigerator between 5:00 p.m. and 6:00 p.m. every weeknight. However, predictive analytics program 112 is not limited by the aforementioned embodiments and may make predictions based on metadata associated with the historical record of user touch events of one or more objects, such as electronic objects, electromechanical objects, and non-electronic or electromechanical objects acting as EM noise signal propagating antennas.

Predictive analytics program 112 determines actions associated with predicted user touch events (step 214). Predictive analytics program 112 may infer which actions are applicable in a situation. For example, predictive analytics program 112 may display advertisements for local produce sales before an anticipated dinner time. In an embodiment, a user may input a particular response action into database 114 via user interface 106. For example, a user may input a response action that instructs predictive analytics program 112 to engage the home security system after a user touches the building or car door handle as the user leaves for work in the morning. An action may include communication with one or both EM noise signal detecting device 104 and client device 108, where client device 108 has an instance of user interface 106. In some embodiments of the present invention, predictive analytics program 112 may determine the action is to send a notification to a user via one or both EM noise signal detecting device 104 and client device 108. For example, predictive analytics program 112 may determine that the action is to display an advertisement for local produce sales between the hours of 4:00 p.m. and 5:00 p.m. on one or more of the user's devices, such as a smart phone and network-connected television, based on predictive analytics program 112 learning that the user will likely eat dinner between 6:00 p.m. and 7:00 p.m following a pattern of user touch events associated with kitchen appliances. In another example, predictive analytics program 112 may determine that the action is to display a reminder to wear goggles between the hours of 9:00 a.m. and 10:00 a.m. before a user touches a power tools, based on predictive analytics program 112 learning that the user will likely use power tools between 10:00 a.m. and 11:00 a.m. following a pattern of user touch events associated with construction equipment.

In another example, where the function of EM noise signal detecting device 104 is included within a wearable smart watch, predictive analytics program 112 may determine that the action is to send the user a reminder through the user's smart watch that a lightbulb in a lamp that the user turns on for three hours a day is predicted to reach the end of its useful life shortly by using a technique known in the art. In another embodiment, predictive analytics program 112 may determine that the action is to send an executable machine-readable program instruction to one or both EM noise signal detecting device 104 and client device 108. For example, predictive analytics program 112 may determine that the action is to send an executable machine readable instruction to network-connected lamps to turn on at 4:30 p.m. and off at 10:00 p.m. based on predictions that the user will arrive home from work between 4:45 p.m. and 5:00 p.m. and go to sleep between the hours of 9:45 p.m. and 10:15 p.m.

In another example, predictive analytics program 112 may determine that the action is to send an executable machine readable instruction to a network-connected electric toothbrush to turn on at 7:00 a.m. based on a prediction that the user will brush his teeth between the times of 7:00 a.m. and 7:05 a.m. In yet another embodiment, the action may be a combination of both notifications and machine readable program instructions to be sent to a device via one or both EM noise signal detecting device 104 and client device 108. For example, predictive analytics program 112 may determine that the action is to send an executable machine readable instruction to a network-connected television to turn on at 4:45 p.m., display a user-specific notification on the network-connected television, and also send a reminder to a smart watch, where EM noise signal detecting device 104 is a network-connected watch.

Predictive analytics program 112 performs the actions (step 216). Responsive to determining an applicable action, predictive analytics program 112 performs the determined action, which is based on the analysis of the multiple EM noise signals and associated metadata detected corresponding to user touch events. The action may be one or more simultaneous actions, delayed actions, or combination of both.

Figure 3:
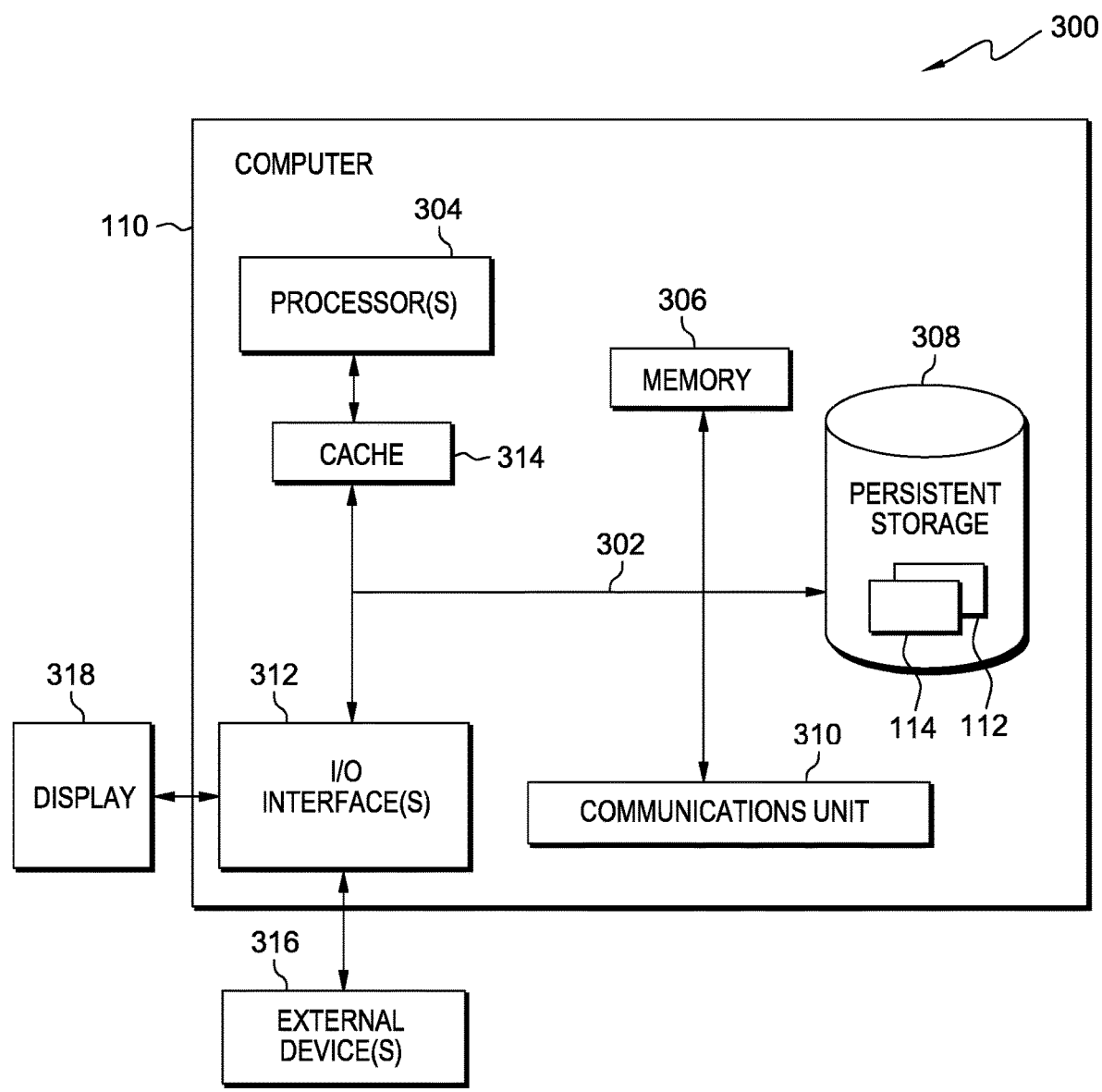
FIG. 3 depicts a block diagram of components of the server computer executing the predictive analytics program within the distributed data processing environment of FIG. 1, in accordance with an embodiment of the present invention.

FIG. 3 depicts a block diagram of components of server computer 110 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., predictive analytics program 112 and database 114, are stored in persistent storage 308 for execution and/or access by one or more of the respective processor(s) 304 of server computer 110 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of EM noise signal detecting device 104 and client device 108. In these examples, communications unit 310 includes one or more network interface cards. Communications unit 310 may provide communications through the use of either or both physical and wireless communications links. Predictive analytics program 112, database 114, and other programs and data used for implementation of the present invention, may be downloaded to persistent storage 308 of server computer 110 through communications unit 310.

I/O interface(s) 312 allows for input and output of data with other devices that may be connected to server computer 110. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., predictive analytics program 112 and database 114 on server computer 110, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for predicting user touch events, the method comprising:
   receiving, by one or more computer processors, a detected electromagnetic noise signal of an object;
   comparing, by the one or more computer processors, the detected electromagnetic noise signal of the object to one or more stored electromagnetic noise signals associated with one or more objects;
   based, at least in part, on the comparison, determining, by the one or more computer processors, the identity of the object;
   responsive to determining the identity of the object, storing, by the one or more computer processors, metadata corresponding to an electromagnetic noise signal detection event associated with the object;
   determining, by the one or more computer processors, whether a quantity and a frequency of recorded metadata related to user touch events stored as historical data and associated with the one or more objects and corresponding to the electromagnetic signal detection event associated with the object meets a learning threshold;
   responsive to determining the quantity and the frequency of the recorded metadata corresponding to the electromagnetic signal detection event associated with the object meets the learning threshold, predicting, by the one or more computer processors, a subsequent electromagnetic noise signal detection event associated with the object;
   establishing a pattern of user touch events for the object correlating to user behavior as part of the determining whether the quantity and the frequency of the recorded metadata corresponds to the electromagnetic signal; and
   predicting the subsequent electromagnetic noise signal detection event associated with the object with a predetermined confidence level by the established pattern of the user behavior correlated to the pattern of the user touch events for the object.

2. The method of claim 1, further comprising:
   based, at least in part, on the subsequent electromagnetic noise signal detection event associated with the object, determining, by the one or more computer processors, an action based on the prediction; and
   performing, by the one or more computer processors, the action.

3. The method of claim 2, wherein the action is selected from the group consisting of: displaying an advertisement on one or more computing devices associated with a user, sending an executable machine readable instruction to the one or more computing devices, and a combination of displaying an advertisement and sending an executable machine readable instruction to the one or more computing devices.

4. The method of claim 1, further comprising:
   responsive to determining the quantity and the frequency of the recorded metadata corresponding to the electromagnetic signal detection event associated with the object does not meet the learning threshold, receiving, by the one or more computer processors, one or more additional detected electromagnetic noise signals associated with the object; and
   storing, by the one or more computer processors, additional metadata associated with the one or more additional detected electromagnetic noise signals.

5. The method of claim 1, further comprising prompting, by the one or more computer processors, a user to input metadata associated with the object.

6. The method of claim 1, wherein predicting the subsequent electromagnetic noise signal detection event further comprises utilizing, by the one or more computer processors, a predictive analytics algorithm selected from the group consisting of: a time series model and a supervised learning classifier.

7. The method of claim 6, wherein the supervised learning classifier is a regression analysis.

8. A computer program product for predicting user touch events, the computer program product comprising:
   one or more computer readable storage devices and program instructions stored on the one or more computer readable storage devices, the program instructions being readable/executable by one or more processors, the stored program instructions comprising:
   program instructions to receive a detected electromagnetic noise signal of an object;
   program instructions to compare the detected electromagnetic noise signal of the object to one or more stored electromagnetic noise signals associated with one or more objects;

based, at least in part, on the comparison, program instructions to determine the identity of the object;

responsive to determining the identity of the object, program instructions to store metadata corresponding to an electromagnetic noise signal detection event associated with the object;

program instructions to determine whether a quantity and a frequency of recorded metadata corresponding to the electromagnetic signal detection event associated with the object meets a learning threshold;

responsive to determining the quantity and the frequency of the recorded metadata corresponding to the electromagnetic signal detection event associated with the object meets the learning threshold, program instructions to predict a subsequent electromagnetic noise signal detection event associated with the object;

program instructions to establish a pattern of user touch events for the object correlating to user behavior as part of the determining whether the quantity and a frequency of recorded metadata corresponds to the electromagnetic signal; and program instructions to predicting the subsequent electromagnetic noise signal detection event associated with the object with a pre-determined confidence level by the established pattern of the user behavior correlated to the pattern of the user touch events for the object.

9. The computer program product of claim 8, the stored program instructions further comprising:
based, at least in part, on the subsequent electromagnetic noise signal detection event associated with the object, program instructions to determine an applicable action based on the prediction; and
program instructions to perform the applicable action.

10. The computer program product of claim 9, wherein the applicable action is selected from the group consisting of displaying an advertisement on one or more computing devices, sending an executable machine readable instruction to the one or more computing devices, and a combination of displaying an advertisement and sending an executable machine readable instruction to the one or more computing devices.

11. The computer program product of claim 8, the stored program instructions further comprising:
responsive to determining the quantity and the frequency of the recorded metadata corresponding to the electromagnetic signal detection event associated with the object does not meet the learning threshold, program instructions to receive one or more additional detected electromagnetic noise signals associated with the object; and
program instructions to store additional metadata associated with the one or more additional detected electromagnetic noise signals.

12. The computer program product of claim 8, the stored program instructions further comprising program instructions to prompt a user to input metadata associated with the object.

13. The computer program product of claim 8, wherein predicting the subsequent electromagnetic noise signal detection event comprises program instructions to utilize a predictive analytics algorithm selected from the group consisting of a time series model and a supervised learning classifier.

14. The computer program product of claim 13, wherein the supervised learning classifier is a regression analysis.

15. A computer system for predicting user touch events, the computer system comprising:
one or more computer processors;
one or more computer readable storage devices;
program instructions stored on the one or more computer readable storage devices for execution by at least one of the one or more computer processors, the stored program instructions comprising:
program instructions to receive a detected electromagnetic noise signal of an object;
program instructions to compare the detected electromagnetic noise signal of the object to one or more stored electromagnetic noise signals associated with one or more objects;
based, at least in part, on the comparison, program instructions to determine the identity of the object;
responsive to determining the identity of the object, program instructions to store metadata corresponding to an electromagnetic noise signal detection event associated with the object;
program instructions to determine whether a quantity and a frequency of recorded metadata corresponding to the electromagnetic signal detection event associated with the object meets a learning threshold;
responsive to determining the quantity and the frequency of the recorded metadata corresponding to the electromagnetic signal detection event associated with the object meets the learning threshold, program instructions to predict a subsequent electromagnetic noise signal detection event associated with the object;
program instructions to establish a pattern of user touch events for the object correlating to user behavior as part of the determining whether the quantity and a frequency of recorded metadata corresponds to the electromagnetic signal; and
program instructions to predict the subsequent electromagnetic noise signal detection event associated with the object with a pre-determined confidence level by the established pattern of the user behavior correlated to the pattern of the user touch events for the object.

16. The computer system of claim 15, the stored program instructions further comprising:
based, at least in part, on the subsequent electromagnetic noise signal detection event associated with the object, program instructions to determine an applicable action based on the prediction; and
program instructions to perform the applicable action.

17. The computer system of claim 16, wherein the applicable action is selected from the group consisting of displaying an advertisement on one or more computing devices, sending an executable machine readable instruction to the one or more computing devices, and a combination of displaying an advertisement and sending an executable machine readable instruction to the one or more computing devices.

18. The computer system of claim 15, the stored program instructions further comprising:
responsive to determining the quantity and the frequency of the recorded metadata corresponding to the electromagnetic signal detection event associated with the object does not meet the learning threshold, program instructions to receive one or more additional detected electromagnetic noise signals associated with the object; and
program instructions to store additional metadata associated with the one or more additional detected electromagnetic noise signals.

19. The computer system of claim 15, the stored program instructions further comprising program instructions to prompt a user to input metadata associated with the object.

20. The computer system of claim 15, wherein predicting the subsequent electromagnetic noise signal detection event comprises program instructions to utilize a predictive analytics algorithm selected from the group consisting of a time series model and a supervised learning classifier.

* * * * *